UNITED STATES PATENT OFFICE.

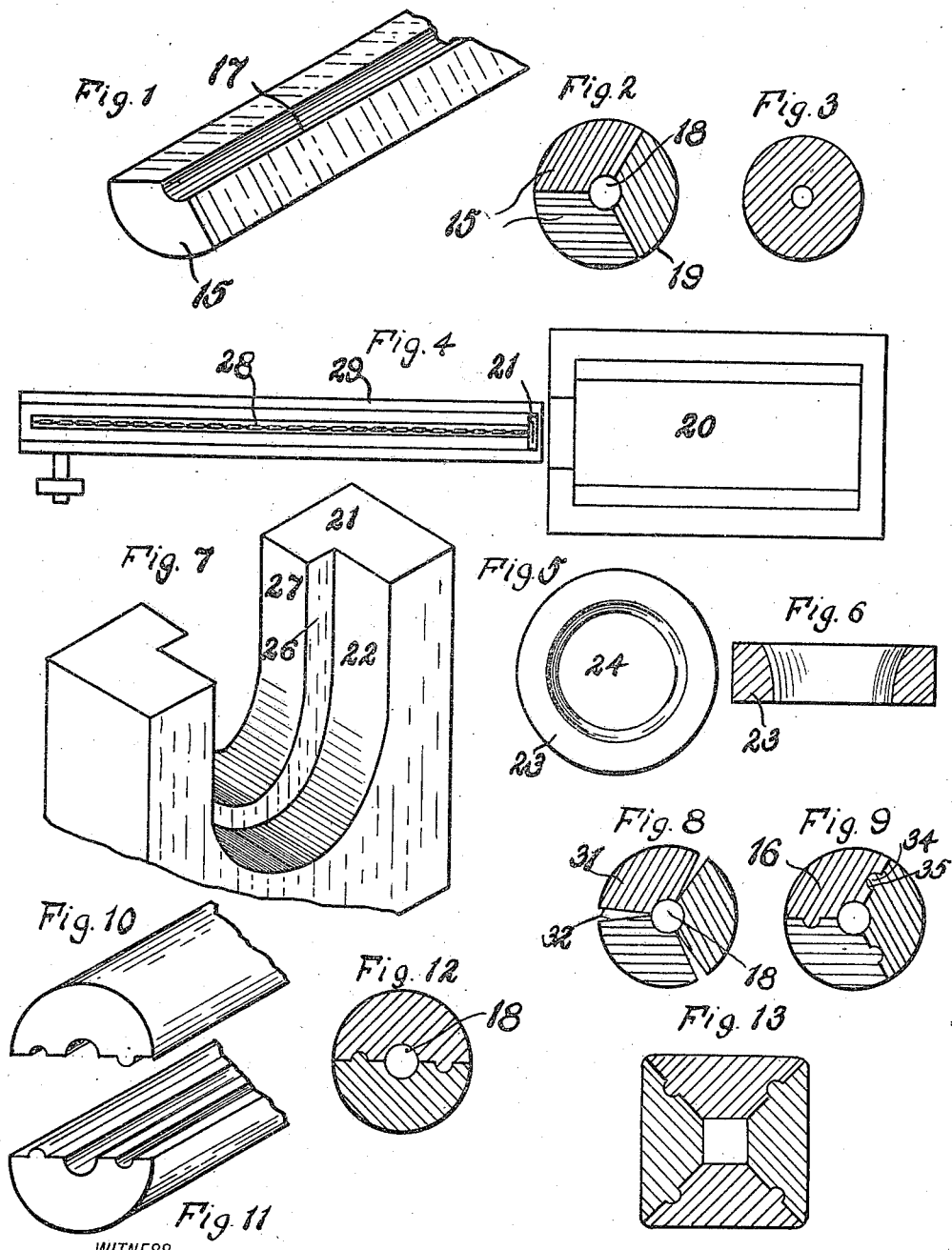

WESTON JENKINS, OF ROME, NEW YORK, ASSIGNOR TO ROME MERCHANT IRON MILL, OF ROME, NEW YORK, A CORPORATION OF NEW YORK.

METHOD OF MAKING TUBULAR BARS.

1,231,897.  Specification of Letters Patent.  Patented July 3, 1917.

Application filed June 29, 1916. Serial No. 106,578.

*To all whom it may concern:*

Be it known that I, WESTON JENKINS, a citizen of the United States, residing at Rome, county of Oneida, and State of New York, have invented certain new and useful Improvements in Methods of Making Tubular Bars, of which the following is a specification.

This invention relates in general to a method of making tubular bars and in particular to a method of making hollow stay-bolt iron. One of the primary objects of my invention consists in an improved method of making hollow rods or similar articles, such for example as stay-bolts, in such manner as to secure maximum strength with no wastage of metal, while at the same time the contour of the exterior surface and of the central opening is maintained uniform and true. Another object of the invention resides in the provision of an improved method of making hollow rods such as stay-bolts whereby a superior product and a uniformity in product are obtained, the process being simple in character and effecting a saving in material and labor as well as equipment wherewith to carry out the steps of the process. My invention also contemplates the provision of improved steps in welding the sections of a sectional tubular rod together. One of the more specific of the objects of my invention is the provision of an improved method of making a hollow rod from a plurality of complementary or counterpart sections which are placed together to form the rod and welded, the meeting faces having extended surfaces to facilitate the welding process and being so arranged that the sections are maintained in proper position preliminary to the welding.

The foregoing, together with such other objects as may hereinafter appear, or are incident to my invention, I obtain by means of a construction and process, one embodiment of which I have shown in the accompanying drawings as applied to the making of stay-bolts. Of the drawings—

Figure 1 is an isometric projection of the preferred form of section of wrought iron used in making articles according to my process; Fig. 2 is a cross-sectional view through three sections such as shown in Fig. 1 after they have been brought together but before they have been welded; Fig. 3 is a cross-sectional view through a completed piece of stay-bolt iron as formed by my process; Fig. 4 is a plan view more or less conventionalized and on a greatly reduced scale of a furnace and draw-bench suggesting a convenient arrangement of apparatus for the performance of my process; Fig. 5 is a front face view of a bell-shaped die such as is preferably used in practising my process; Fig. 6 is a cross-sectional view through the die shown in Fig. 5; Fig. 7 is an isometric projection of a draw-head that may be conveniently utilized to hold the dies; Fig. 8 is a cross-sectional view through a group of three sections of wrought iron of modified form after they have been brought together but before being welded; Fig. 9 is a cross-sectional view through three sections of another modified form that may be used in practising my invention, the pieces being shown after they have been brought together but before being welded; Figs. 10 and 11 are isometric projections of two sections of wrought iron shaped to carry out my process in its simplest form; Fig. 12 is a cross-sectional view of the parts shown in Figs. 10 and 11 after they have been placed together but before being welded; Fig. 13 indicates the application of my invention to the construction of a form which is square both inside and outside.

The invention will be described as applied to stay-bolts, although it will be understood as being applicable to other forms of tubular rods. On account of the peculiar strain placed upon stay-bolts it is practically universally required that they be formed of wrought iron and be provided with a small central opening therethrough in order to give a warning by steam or water whenever a stay-bolt has been broken or strained so as to be fractured part-way through.

My invention in brief consists in forming a hollow stay-bolt of wrought iron by forming wrought iron into sections more or less sector-shaped in cross-section with their vertex portions cut away to form the central opening; then a proper number of these sections are placed together to form a hollow cylinder and then this group of sections is welded together without closing or distorting the central opening by raising the iron to a welding heat and compressing the bundle to the necessary extent preferably by drawing said bundle through a die.

My process will be more clearly understood by referring to the drawings herein and to the hereinafter detailed explanation of the process and its several steps.

The first step in practising my invention is to form the weldable metal of the proper quality, such for example as wrought iron, into sections of the desired length which shall be of such shape in cross-section as to be sector-shaped or some part of a circle and preferably an aliquot part of a circle. Thus, in Figs. 1 and 2 there are shown such sections 15, each of which is substantially a third of a circle in cross section, but it will be obvious that other sector-shaped sections may be used such as a quadrant-shaped piece or pieces which have a more acute angle between their plain sides than ninety degrees. I prefer, however, to use sections such as section 16 and particularly such a section provided with interlocking means such as shown in Fig. 9, for reasons hereinafter stated.

The sections of wrought iron furthermore have their vertex portions cut away or grooved as plainly shown in the drawings. Such grooves 17 preferably being so formed as to have a center common with the center of the sector of said sections. A convenient way to form the sections of wrought iron into proper sector-like shape with their re-entering grooves 17 is by rolling the iron to that shape, but other means may be used if convenient.

The next step of my process is to bring together the proper number of sector-like sections to form therefrom a hollow cylinder of which the walls are relatively thick and the central opening 18 formed from the various grooves 17 is relatively small.

The group or "pile" 19 of sections is then heated by any suitable means such as in a furnace 20 until said group or pile has been brought throughout its length to a proper welding heat. Then the pile or group of sections is passed through a bell-shaped die or dies whereby the different sections are welded together into a solid uniform mass but with the central opening 18 still maintained through the mass which is now a piece of hollow stay-bolt iron.

As suggestive means for performing these operations by machinery I have shown the furnace 20 of any suitable form or character to produce the desired heat and of a length sufficient to contain the piles. Preferably also the furnace will be of such width and so constructed as to receive thereinto a number of piles 19 of these sections side by side in order to carry on the process as efficiently as possible. Closely located outside the furnace 20 is the draw-head 21 with its slot 22 in which is placed a die or a number of dies 23. The die has a circular opening 24 therein of tapering or bell-shaped form as plainly shown in Fig. 6. The die is placed in the slot 22 of the draw-head with its side 25 which has the smaller end of the aperture 24 against the shoulder 26 in the draw-head beyond which is the smaller slot 27 of a size a little larger than the smallest diameter of the aperture 24 in the die.

As the end of the pile 19 of sections properly raised to welded heat comes from the furnace it is led through the bell-shaped die 23 in the draw-head 21 and the rest of the pile 19 drawn through said die by means of the power-operated chain 28 upon the draw-bench 29. Any desired means may be used for introducing the end of the heated sections through the die and connecting them to the drawing chain 28.

As the pile 19 or bundle of sections so heated are thus drawn through the die 23 the adjacent sides of contiguous sections are pressed closely together and are welded together without closing up the small central opening 18. As the bundles of sections are closely circular in outline and as the aperture of the die is circular and of slightly less diameter than the pile 19 of sections presented thereto it will be apparent that the whole mass is subjected to equal pressure inwardly from all directions toward the center. The result of this equal inward compression all around the circle of the pile being welded together with the drawing action is to reduce the cross-sectional area of the pile and at the same time lengthen the iron being operated upon. The most important advantage, however, which is obtained by this method is that the outer contour of the completed rod is absolutely true, that is, truly circular, while at the same time the central orifice is not distorted in the slightest. For most purposes it is preferable to pass the mass of metal several times through dies of gradually decreasing aperture so as to effect a more gradual compression and a more gradual elongation of the mass. If necessary also the mass may be re-heated between these different passes or may be simply returned to the furnace to prevent further reduction in heat between passes.

It will be seen that this compression of the hollow cylindrical mass of weldable wrought iron operates to effect a good uniform welding of the different sections in the mass into one homogeneous mass and also operates to compress and force together the fibers of the wrought iron so as to bring out the life, nature or ductility of the wrought iron again after it has been heated. For this reason this process of forming hollow stay-bolt iron from wrought iron by welding does not injure the original character and ductility of the wrought iron, but produces a finished product of as good character and as great ductility as is present in the wrought iron used to begin with.

It will be noticed furthermore that this process does not distort the sections of wrought iron used at the beginning in order to produce the completed product. In other words, the fiber of the wrought iron has not been distorted or dislocated for the reason that the shaping and welding has simply made use of a compressing pressure with some degree of elongation so that the final product is in the same shape as the bundle of sections when first placed together and the cross-sectional shape is the same, but smaller in size. This compression while keeping in the same shape even though elongating the mass of metal does not distort or dislocate or injure in any way the fiber of the metal or its inherent and desirable characteristics. For this reason also this process is essentially different from those processes where tubing is formed by bending a flat piece into a circle and welding its abutting edges.

As a further result of maintaining the shape of the sections of wrought iron as they are welded together by my process and the use of pressure inwardly from all directions great reliability or uniformity of manufacture is obtained and stay-bolt iron of a uniform high character and of uniform size, strength and other tests is produced. For the same reasons the waste material is greatly reduced in amount or entirely eliminated. Low cost of manufacture is also attained by reason of the above facts and from the simpleness of the steps of the process and the ease with which they may be made.

Although the walls of the stay-bolt iron produced by my process may be very thick and the central opening relatively very small, the steps of my process are such that the central opening is readily maintained in the completed product and maintained with all necessary uniformity of size. Among the factors which contribute to this advantage may be mentioned the sector shape of the sections, the use of compression inwardly from all directions, the ease with which several passes of the material through the pressing means may be used so as not to have undue pressure at any one pass and the further fact that the material in the different sections does not have to be distorted or forced out of its original shape.

In the drawings I have illustrated the sections so far described as being truly sector-shaped in cross-section and substantially this form is preferred because it results in a more uniform distribution of the pressure and a more uniform welding of the iron. It will be obvious, however, that the exterior surfaces may deviate quite a little from true sector shape and still be within the claims of my invention; for instance, irregularity in the arc of the sector or upon the plain surfaces thereof may be present and still obtain a satisfactory result. In fact, in Fig. 8 I have shown a modification of the form of the sections so as to have sections 31 with angular faces 32 which are not exactly radii of the arc surface of the section but are arranged at a slightly smaller angle to each other than in a true sector. This results in the sections 31 when brought together meeting toward the central opening 18, but being slightly separated from each other at the outer surface of the cylinder. This formation has some advantages, in that the first welding is effected toward the central opening and by the time the crevices between the outer surfaces of the sections have been welded it is certain that the weld has been made all the way through to the central opening.

In Fig. 9 I have shown a further and preferred construction of sections, in that the sections 16 here shown have one of their angularly arranged sides provided with a projection or ridge 34 and the other angular face provided with a similar shaped depression or groove 35. It will be obvious that when the proper number of sections of this character are brought together they will fit together or interlock to a certain extent, in that the ridges 34 will engage or fit into the depressions 35. This results in a larger surface to weld and in providing for an easier weld by reason of the interfitting of parts which furthermore maintains the parts in alinement until completely welded. Such arrangement also facilitates the handling of the groups of sections preliminary to the welding steps.

I prefer to form the sections to be used in my process so as to be equal and aliquot parts of the circle. In this way for any given size of stay-bolt iron only one form or size of section need be provided. Furthermore, by having the parts equal, whether two, three, four or more parts be used to make the pile or bundle of sections, they will fit together in the same way and the inward compression as from the dies will distribute that pressure equally among the different sections and so obtain an evenness of welding and an evenness of compression of the material that would not be obtained were some of the sections smaller than others.

The advantages obtained by my improved method are conspicuously present when welding sections of the form shown in Figs. 10 and 11, that is, where the rod is composed of but two counterpart sections. If such sections were rolled for example, the metal would be squeezed out and form external fins, and the orifice would be so distorted that the rod would be practically useless. If to overcome these objections, the metal were disposed in a special manner, the contour of the finished rod would not be true or uniform, which would be equally objectionable.

While in the above description reference has been made to the use of rods of round section both inside and outside, it is obvious that my invention is applicable also to irregular sections or sections which may have square or other shaped apertures inside and which may be either square or of other shape upon the outside as occasion may require and I have in the drawing in Fig. 13 illustrated one such form of construction.

I claim:

1. The herein-described process of making tubular rods which consists in assembling a plurality of sections having faces adapted to contact in a manner to provide a central opening, and then in welding the sections together by uniform inward pressure so as to leave the central opening in the finished product.

2. The herein-described process of making tubular rods which consists in assembling a plurality of sections in a manner to provide a central opening, and then in welding the sections together by drawing them through a die without substantially altering the form of the cross-sectional area of the sections.

3. The process of making tubular rods which consists in bringing together a plurality of sections to form a hollow rod of the desired shape in cross-section, each section in cross-section constituting a substantially true part of said shape, said sections having grooves adapted to form the central opening in the rod, and then in welding the sections together by uniform inward pressure.

4. The herein described process of making hollow rods which consists in assembling sections each forming part of a circle in cross-section and having a groove, in placing said sections together to form the hollow rod, and in forcing the sections through a die when hot to weld the same.

5. The process of making hollow stay-bolt iron which consists of forming wrought iron into sections substantially sector-shaped in cross-section with their vertex portions cut away or grooved, placing a plurality of said sections together to form a hollow cylinder with relatively thick walls and a small central opening, bringing the iron to a welding heat and welding the sections together without closing the central openings.

6. The process of making hollow stay-bolt iron which consists of forming wrought iron into sections substantially sector-shaped in cross-section with their vertex portions cut away or grooved, placing a plurality of said sections together to form a hollow cylinder with relatively thick walls and a small central opening, bringing the iron to a welding heat and welding the sections together without closing the central opening by pressure exerted inwardly uniformly about the circle.

7. The process of making hollow stay-bolt iron which consists of forming wrought iron into sections substantially sector-shaped in cross-section with their vertex portions cut away or grooved, placing a plurality of said sections together to form a hollow cylinder with relatively thick walls and a small central opening, bringing the iron to a welding heat and welding the sections together without closing the central opening by drawing them through dies.

8. The process of making hollow stay-bolt iron which consists of forming wrought iron into sections substantially sector-shaped in cross-section with their vertex portions cut away or grooved, placing a plurality of said sections together to form a hollow cylinder with relatively thick walls and a small central opening, bringing the iron to a welding heat and welding the sections together without closing the central opening by drawing them through dies having successively decreasing sizes of apertures.

9. The process of making hollow stay-bolt iron which consists of forming wrought iron into sections substantially sector-shaped in cross-section with their vertex portions cut away or grooved, placing a plurality of said sections together to form a hollow cylinder with relatively thick walls and a small central opening, bringing the iron to a welding heat and welding the sections together without closing the central opening by pressure exerted inwardly about the circle without using an inside mandrel.

10. The process of making hollow stay-bolt iron which consists of forming wrought iron into sections substantially sector-shaped in cross-section with their vertex portions cut away or grooved but with the sides that are to meet adjacent sides of the sections forming a slightly smaller angle than required for true sectors, placing a plurality of said sections together to form a hollow cylinder, said sections meeting toward the center but slightly separated toward the circumference, bringing the iron to a welding heat and welding the sections together by uniform inward pressure.

In testimony whereof I have hereunto signed my name.

WESTON JENKINS.